United States Patent [19]
Suzor

[11] 4,234,350
[45] Nov. 18, 1980

[54] PROCESS FOR THE PURIFICATION OF EVAPORATED SUGAR SOLUTIONS

[75] Inventor: Norland L. C. Suzor, Paauhau, Hi.

[73] Assignee: Davies Hamakua Sugar Co., a division of Theo. H. Davies, Ltd., Paauilo, Hi.

[21] Appl. No.: 36,834

[22] Filed: May 7, 1979

[51] Int. Cl.[2] .......................... B01D 21/00; C13D 3/16; C13D 3/00

[52] U.S. Cl. .......................... 127/48; 127/9; 127/12; 127/55; 127/57; 210/151; 210/703

[58] Field of Search .................. 127/57, 48, 9, 12, 55; 210/44, 151

[56] References Cited

U.S. PATENT DOCUMENTS

| | | | |
|---|---|---|---|
| 2,518,296 | 8/1950 | Eguchi | 127/57 X |
| 2,633,453 | 3/1953 | McAllister | 127/57 X |
| 3,508,965 | 4/1970 | Harrison | 127/57 X |
| 3,853,616 | 12/1974 | Rundell | 127/57 X |
| 3,909,287 | 9/1975 | Rundell | 127/57 |
| 3,926,662 | 12/1975 | Rundell | 127/57 X |
| 4,000,001 | 12/1976 | Toth | 127/57 X |

*Primary Examiner*—Sidney Marantz
*Attorney, Agent, or Firm*—William B. Walter

[57] ABSTRACT

A process for the purification of evaporated sugar solutions prior to crystallization, utilizing the discovery that most of the suspended non-sugar particles within the evaporated sugar solution are hydrophobic in nature and thus thrown out of solution during the loss of water during the evaporation process, by thoroughly mixing air in large quantities with the evaporated sugar solution containing such particles and repeatedly subjecting the mixture of air, sugar solution and non-sugar particles to high shear forces by a surging flow with flow reversals through an aerator so as to produce a uniform creamy mixture of micron size bubbles to which the non-sugar particles are intimately and mechanically attached, having moved out of the evaporated sugar solution because of the hydrophobic character of the particles. Optionally, this aggregation of the particles with the micron size bubbles may be further increased by a controlled addition of an anionic partially hydrolized polyacrylamide following aeration. The removal of the aggregates is completed either by filtration or flotation.

11 Claims, 4 Drawing Figures

PROCESS FOR THE PURIFICATION OF EVAPORATED SUGAR SOLUTIONS

BACKGROUND OF THE INVENTION

In a typical raw sugar factory, the cane is prepared for grinding in the mills by revolving knives. The prepared cane is then subjected to squeezing through heavy mill rollers where the juice is extracted. That juice contains both soluble and insoluble materials. The insoluble portion is primarily fiber with some soil particles which are mechanically removed by screening. The soluble portion is constituted mainly of various saccharides, predominantly sucrose, accompanied by a lesser amount of both organic and inorganic non-sugars. The percentage ratio of saccharides to total solubles, sugars and non-sugars, in solution is expressed as the Purity Index, which is typically in the range of 75 to 93. These non-sugars increase the solubility of sucrose, thus during the crystallization process, prevent by their presence, the crystallization of a portion of the sucrose fraction respective to the degree to which the solubility has been increased. Therefore, the objective is to purify the juice prior to crystallization. Purification, which is termed clarification, or defecation, is usually achieved by the addition of both heat and lime in various combinations. Unfortunately, no presently known method of clarification is capable of achieving the complete removal of the soluble non-sugars from the juice. In actuality, no more than a two point increase in Purity Index is ever obtained. Generally, sufficient lime is added to neutralize the organic acids present in the juice after which the temperature is raised to 210° F. or above. This combined treatment forms a heavy precipitate of complex compositions containing insoluble lime salts, coagulated albumin and varying proportions of fats, waxes and gums. The precipitate is flocculent and carries with it most of the finely suspended material in the juice which has escaped the mechanical screening. The separation of the precipitate from the surrounding juice is almost universally accomplished by decantation in clarifiers, having a minimum retention time of approximately two hours. Under proper control, a clarified juice is obtained which is practically free of turbidity creating material and is almost transparent.

The clarified juice goes to the multiple effect evaporators without further treatment. The evaporators consist of a series of bodies; each succeeding body is boiled from the evaporation vapour of the preceding one and vapour from the last body being condensed in a contact condenser. From the evaporators, a syrup is obtained containing approximately 20% of the original water content of the clarified juice. The concentration of total soluble solids in the syrup is expressed in degree Brix and is usually in the range of 60° to 70°, corresponding to a specific gravity of 1.28 to 1.35; the clarified juice being of 10° to 13° Brix with corresponding specific gravity varying between 1.03 and 1.05.

The crystallization of the syrup is performed in single effect vacuum pans under reduced pressure. The syrup is further evaporated until saturation. At this stage, crystals separate in the boiling mass or seed crystal is added to serve as nuclei for the crystals. The pan is charged with syrup intermittently as the water evaporates, and the sugar contained in the syrup is largely deposited upon the nuclei without the formation of additional crystals. When the pan is filled with crystal of appropriate size, the mixture of crystals and syrup is concentrated to a dense mass, "massecuite", which is then discharged from the pan. The massecuite is then purged in a high speed centrifugal having a cylindrical perforated metal basket, lined with wire cloth and perforated bronze screen. The sugar crystals are retained by the lining while the melter liquor, "molasses", is forced through the sugar layer and lining by centrifugal force. This molasses is crystallized again yielding a second grade sugar and molasses. Recrystalization of the molasses is repeated until such a lower molasses purity is obtained that it will no longer yield any more sugar by crystallization. That molasses is then discarded as Final Molasses which then contain such a high content of non-sugars to maintain its sucrose content in solution.

During the evaporation of the clarified juice to the syrup, a considerable quantity of non-sugars that were soluble in the clarified juice became insoluble in the syrup due to the loss of 80% of the juice's original water content. A small amount of these impurities deposit themselves upon the heating surface of the evaporator forming hard scale, but the major portion remain in suspension in the syrup and are entrained to the crystallization process. During the crystallization process, the syrup in the pan is subjected to further evaporation and while the sugar crystals are improving in size, the Purity Index of the syrup decreases as a result of the migration of the sugar fraction to the crystal surfaces. Thus, the soluble non-sugar content of the syrup increases, and as some of these non-sugars are high color contributors, the color of the syrup constituting the crystallization media tremendously increases towards approximately double its original colour value prior to crystallization. Therefore along the crystallization process, these insoluble impurities, precipitated out of the clarified juice during evaporation to syrup, are inevitably occluded within the various layers of the forming crystals and carry with them the high coloured mother liquor of decreasing purity. When this massecuite is purged in the centrifugal, a sugar of high apparent colour is obtained which has a well documented detrimental effect on refinability.

Furthermore, during purging, the portion of these insoluble non-sugars that were not occluded in the crystal, causes blockages of the channels existing between the crystals through which the mother liquor is supposed to be forced out. This results in more high coloured molasses being retained with the sugar further yielding a poor quality sugar which will create difficulties during the process of refining of the raw sugar to white consumer sugar, greatly increasing production costs.

Formerly, attempts were made to remove these insoluble impurities by settling and decantation in syrup-settling tanks having retention time of six to twenty-four hours. Even then, the removal of sediments was largely incidental to these insoluble materials originally present in the juice not removed during the clarification prcoess prior to evaporation. Furthermore, large modern factories do not have tank space to permit settling of syrup. Apart from the fact that the impurities precipitated or thrown out of solution during evaporation are mostly in the micron size and being slightly lighter than the syrup, they would therefore mostly remain in suspension while an insignificant amount would float. Various studies in literature verify this effect.

Various processes utilizing chemical additives, such as phosphates and lime in combination with moderate aeration, are utilized to float these impurities out of the syrup in low retention tanks or clarifier. These chemical processes suffer from various disadvantages. For example, when a calcium phosphate precipitate is formed in the syrup, they show high absorption capacity and will definitely attract the micron size precipitated impurities but unfortunately, their sizes are somewhat larger and therefore entrain with them a high proportion of the syrup itself and thus must be further subjected to another separation process to recover the syrup. Furthermore, these large calcium phosphate precipitates are friable and cannot be subjected to intensive aeration which can only be obtained by violent mechanical means, if subject to intensive aeration, a large portion of these precipitates are eroded and again somehow defeat the initial intent of their optimum utilization. Moreso, whenever chemicals are added to a sugar solution, it is impossible to ensure a complete interreaction between the various reagents, therefore a portion of these reagents remains in solution in the syrup, increasing the non-sugar concentration of the latter which result in lesser sugar recovery by crystallization due to the increase in sucrose solubility by the presence of these added non-sugars.

In Rundell et al U.S. Pat. No. 3,834,541, the inventors note that they have found the following steps necessary to achieve optimum flocculation of the suspended solids and efficient clarification of the liquor: a. forming a primary floc in the liquor; b. aerating the liquor containing the primary floc, with agitation; c. distributing an organic polymeric flocculant uniformly throughout the liquid phase of the aerated liquor to initiate the formation of a secondary floc therein; d. retaining the resulting mixture in a flocculator vessel with nonturbulent agitation preventing the segregation of the secondary floc from the liquor and allowing the secondary floc to grow; e. transferring the liquor, with minimum agitation, from the flocculator vessel to a separator vessel; f. allowing the secondary floc to segregate by flotation from the liquor in the separator vessel; and g. separately removing clarified liquor and flocculated solids from the separator vessel. "The aeration of the liquor containing the primary floc can be achieved by blowing in air under pressure, by venturi suction into a pipe through which the liquor is flowing, or by releasing air already present in the liquor, for example, mechanically or by heating the liquor. The air bubbles should be thoroughly broken up and mixed into the liquor, to produce a fine dispersion of air bubbles therein and ensure satisfactory subsequent aeration of the floc. This can be achieved for example, in the case of a melter liquor by using a centrifugal pump with an open impeller, operating at a tip speed of about 100 feet per second."

Some technologists, among many, have demonstrated that subjecting the syrup or any sugar media containing these precipitated non-sugars to centrifugal separators improves both the quality of the sugar as well as their recovery.

Unfortunately, these centrifugal separators, although fitted with self-cleaning devices, have to be dismantled at regular intervals for more adequate cleaning to maintain optimum efficiency. This situation calls for the installation of standby units to ensure continuous operation and therefore has not been adopted by the sugar industry as a whole.

SUMMARY OF THE INVENTION

This invention utilizes my discovery that most of the impurities within evaporated sugar solutions are suspended discrete particles of non-sugars which are hydrophobic in character to create aggregations of these particles on finely divided air bubbles produced by aspiration of large bubbles of air into the sugar solution flowing from the evaporators to the crystallization processing equipment and thoroughly mixing the air, sugar solution and hydrophobic particles of non-sugars in a mechanical aerator which repeatedly subjects the mixture to high shear forces by a surging flow with flow reversals within and through the aerator to produce a uniform creamy mixture of such aggregations and sugar solution, which aggregations are subsequently separated from the sugar solution thus purified by filtration or preferably flotation processes. Optionally, a minor amount of an anionic partially hydrolized polyacrylamide is added to the creamy mixture flowing out of the aerator to enhance the size of the aggregates and thus accelerate subsequent separation of the aggregates from the sugar solution.

DESCRIPTION OF THE DRAWINGS

In the accompanying drawings.

DESCRIPTION OF THE INVENTION

My discovery of the hydrophobic characteristics of the discrete particles of non-sugars within the sugar solutions leaving the evaporators has been verified by an infrared analysis of the acid-ether extract of the aggregates which indicates the presence of hydrocarbon oil, fatty ester, fatty acid, some rosin acid, and material similar to lignin or lignosulfonate. The fatty acids are known to behave as non-thio compounds commonly used in ore flotation processes as collectors that modify minerals for attachment to air bubbles to cause them to float. These discrete particles of non-sugars are of such a density that they normally remain in suspension in the liquor. Also their sizes make it impractical to have them effectively removed from the liquor in conventional filters, unless aggregated to larger sizes. Thus flotation is here the preferred method of removing these particles due to the fact that the hydrophobic character of the particles logically indicates air bubbles as the obvious agent to cause aggregation. The air bubbles would provide the bridging mechanism in-between the particles. Simultaneously, the entrapped air within the aggregate would considerably reduce the density of the aggregate, in comparison to that of the particles it contains, to cause it to float in the evaporated liquor (syrup).

Figure 1:
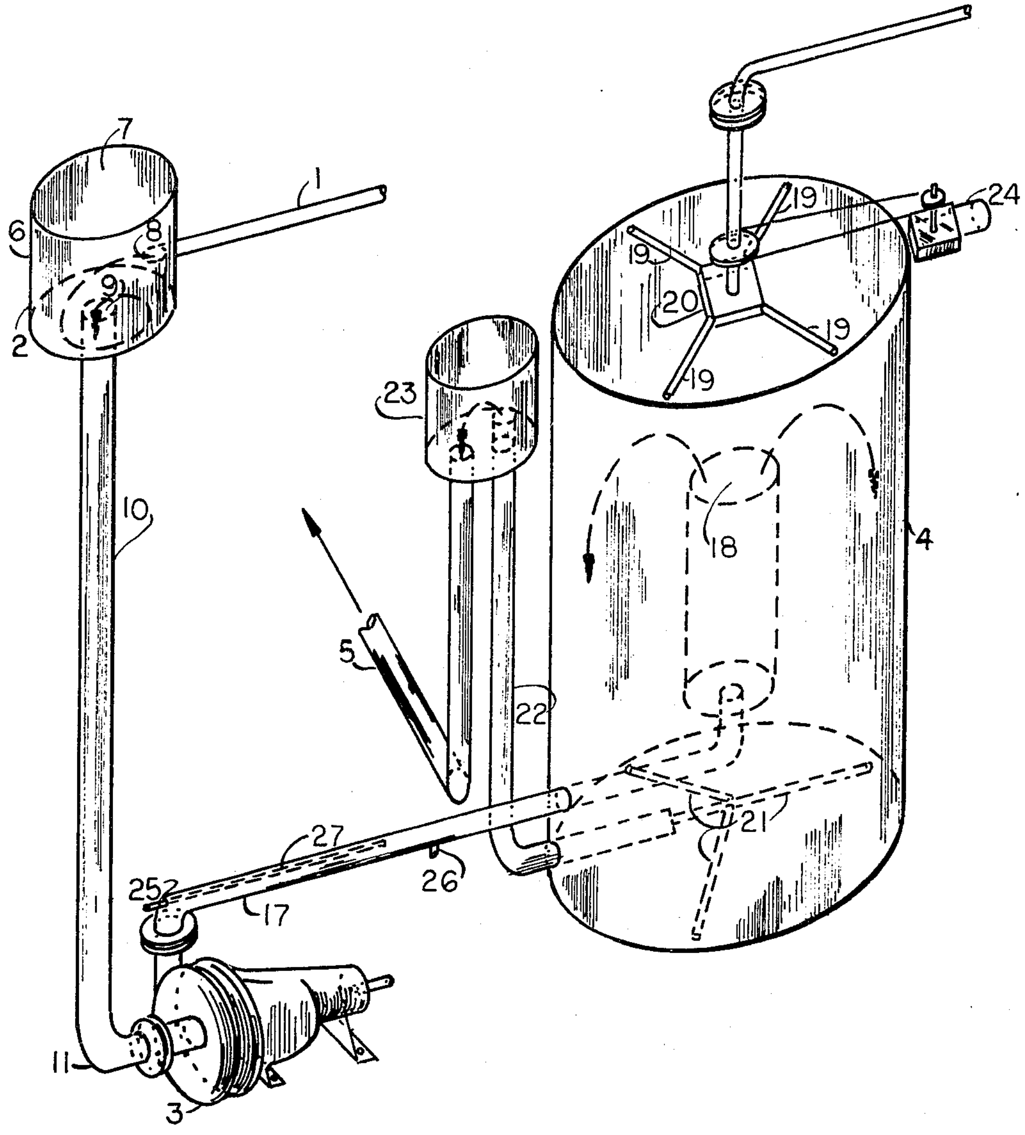
FIG. 1 is a block diagram of an overall view of the system used to perform the process of my invention as per the preferred embodiment of such system.

In the preferred embodiment of the apparatus used to perform the process of the invention, the evaporated sugar liquor extracted from the multiple effect evaporator, preferably the last body, instead of being directed to the vacuum pan supply tank, is routed through a centrifugal aspirator 2, a mechanical aerator-mixer 3, and a clarifier tank 4 in series with a discharge pipe 5 to the vacuum pan supply tank for subsequent crystallization as shown in FIG. 1.

ASPIRATION AERATION MIXING

Figure 2:
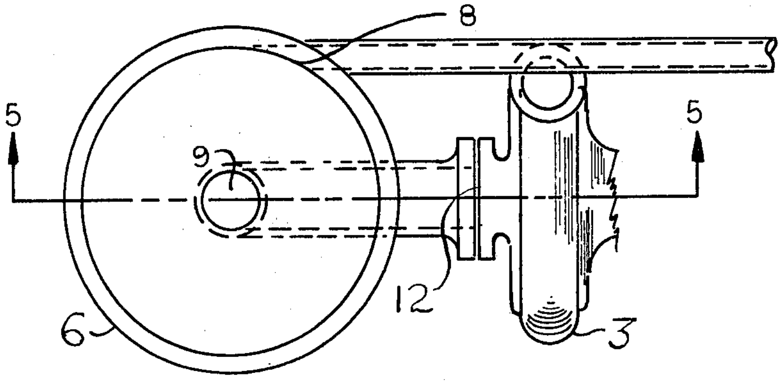
FIG. 2 is a top view of the combined centrifugal aspirator-mechanical aerator-mixer used in the system of FIG. 1.
Figure 3:
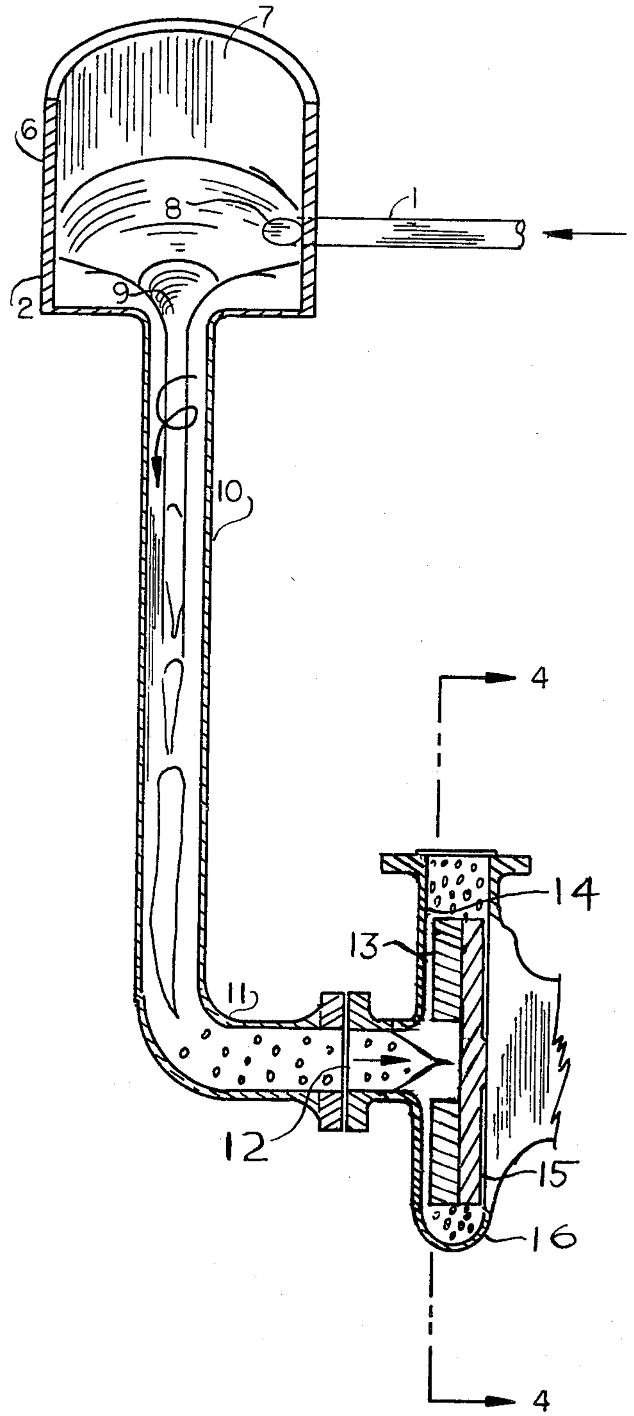
FIG. 3 is a sectional view of the combined centrifugal aspirator-mechanical aerator-mixer along the line 3—3 of FIG. 2.

In the preferred embodiment, the centrifugal aspirator 2 as shown in FIGS. 1, 2 and 3 comprises a cylindrical tank 6 with an open top 7 which serves as an inlet port to admit air, an inlet port 8 disposed tangentially on the cylindrical wall of the tank 6, a tank outlet port centrally located in the bottom of the tank 6, a vertical standpipe 11 connected to the tank outlet port 9 below the tank 6, and a 90° elbow 11 connecting the bottom of the standpipe 10 with the inlet port 12 of the mechanical aerator-mixer 3.

The tangential inlet port 8 directs the incoming sugar liquor to ride along the vertical cylindrical wall of the tank 6 forming a funnel which entrains ambient air in its apex. This apex in turn dissipates towards the center drawoff nozzle or outlet 9 of the flat bottom tank 6 at the entrance to the vertical standpipe 10 and the entrained air forms large bubbles in the syrup flowing down the standpipe 10 as shown in FIG. 3. The length of the standpipe 10 is chosen to provide the mechanical aerator-mixer 3 with a suction static head slightly higher than the vapour pressure of the sugar syrup liquor, typically about 5 pounds per square inch. The vertical standpipe 10 and elbow 11 are sized to allow a flow rate not in excess of a laminar flow characteristic but preferably in the range of 600 to 1,000 Reynolds Number.

The mechanical aerator-mixer 3 is essentially a mixer with an insignificant pumping function. The preferred embodiment of aerator-mixer 3 comprises a semi-open impeller type of centrifugal pump, the impeller of which has straight radial blades 13 attached to a impeller disc 15 with a nominal clearance of about ¼ inch between the outstanding edges of the blades 13 and the pump housing wall 14 for the full length of the blades 13 as shown in FIG. 3. Preferably there is no hub or at the most only a thin nut standing out from the flat surface of the impeller disc 15 securing it to the drive shaft so as to insure the formation of a vortex at the eye of the impeller as will be more fully explained below.

This flat surface at the center of the impeller serves as a wall at right angles to the flow of liquor and air from the standpipe 10 and elbow 11 at which wall a vortex forms as in a mixer. From this vortex, air is thoroughly mixed into the syrup by the blades 13 which are driven at a speed of 3,500 revolutions per minute or more (a tip speed of about 122 feet per second). This mechanical aerator-mixer 3 generates a suction of approximately 2.5 pounds per square inch at the inlet port 12 opposite the center of the impeller disc 15 except when suction is broken by large air bubbles. The vortex created at the drawoff nozzle 9 of the centrifugal aspirator 2 at its connection with the standpipe 10 and the centrifugal flow of the syrup down the standpipe 10 contribute to the formation of the vortex at the eye of the impeller. Pressure gauges (not shown) at the aerator-mixer inlet 12 and the housing periphery 16 indicate fluctuations in pressure during operation of up to 50% with accompanying flow reversals within the aerator-mixer 12 and extending a short distance in the piping connected to the inlet and outlet of the aerator-mixer 12.

With no other additive than ambient air, the syrup flowing into the centrifugal aspirator of my invention is transformed as it passes through the centrifugal aspirator and mechanical aerator-mixer in a continuous in-line process into a creamy liquor having minute non-sugar particles clinging to the surface of micron size air bubbles interspersed within syrup.

The foregoing is a physical description of the apparatus used to prepare the syrup containing non-sugar particles for further clarification. Its function is simply to so treat the non-sugar particles in a continuous in-line process and system that when the mixture of syrup and non-sugar particles is discharged into a large clarifier tank, the non-sugar particles and syrup will separate with the syrup sinking and the non-sugar particles rising so that the non-sugar particles can be drawn off the top of the clarifier tank and the syrup so-purified, drawn off the bottom. As has been described under "Background of the Invention", this has been and is being done in various manners over which this is a distinct improvement and advance in the art because it does not require or use added flocculants or other materials (than air) prior to aeration and mixing with its disadvantages.

In the centrifugal aspirator 2 of this invention, air is added to the syrup in large amounts in the vortex purposely formed at its drawoff nozzle or outlet 9 using the swirling and funneling action of a vortex to drawn air and vapor into a pump. This is in direct opposition to the recommended practice of thwarting or preventing the formation of such vortices by various measures even including vortex breakers as described in *How To Design Piping For Pump-Suction Conditions,* Robert Kern, pages 119–124 and 126, Chemical Engineering, Apr. 28, 1975.

The vortex formed in the centrifugal aspirator 2 feeds air into the syrup in such a manner that large bubbles descend the standpipe 10 alternately decreasing the Net Positive Suction Head below that required to sustain pumping action of the modified centrifugal pump making up the aerator-mixer 3 and allows the pressure in the standpipe 10 and elbow 11 constituting the pump suction line to drop below the vapor pressure of the syrup flowing through it. This also is in direct opposition to recommended operation principles for pumps per the reference publication of "Chemical Engineering" and causes pressure surges in the pump suction line possibly releasing vapor from the syrup and thoroughly mixing the air, vapor, syrup and non-sugar particles by the consequent surging flow reversals in the pump comprising the aerator-mixer 3.

The large amount of air fed into the pump or aerator-mixer 3 with the syrup and the relatively uninterrupted surface of the central portion of the impeller disc 15 combine to permit the formation of a vortex in the eye of the impeller, in the same manner as in many mixers, which causes severe air entrainment in the syrup entering the impeller blades 13.

The inlet edges of the blades 13 of the high speed impeller cause a high degree of fluid shear to reduce the basic particle size, break up any agglomerates of particles and break the air into minute bubbles.

The impeller blades of the conventional centrifugal pump are curved away (swept back) from the direction of rotation so that a natural movement of the fluid will carry it to the outer edge of the impeller. In my modified impeller, the blades are straight and radial, which because of the shorter path for the fluid to flow, attempt to accelerate the fluid at a much higher rate than with swept back blades. The wide space between the adjacent radial blades is believed to allow an intense mixing action, as it has been found that within this aerator-mixer 3, in a simultaneous action, micron size bubbles of air are formed and thoroughly mixed with the syrup and minute non-sugar particles leave the syrup to become attached to the micron size bubbles. This mixing action between the blades 13 is repeated by the surging flow mentioned above. In this intense mixing action, the hydrophobic characteristics of the non-sugar particles cause them to leave the syrup to be attached to the minute bubbles. Because of the pressure surges found in the action of the aerator-mixer 3 it is quite possible that cavitation occurs within it. If so, the bubbles forming just before the inlet edge of the impeller blades 13, collapse following a rapid increase in pressure within the impeller thus contributing to the mixing action and the formation of the micron size bubbles. The maximization of surface area resulting from the reduction in size of air bubbles and the intense recirculation and mixing action within the aerator-mixer 3 favors an intimate contact between the minute bubbles and the particles. Furthermore, due to the compressed distance in between the discrete particles occuring within the vortex formed at the eye of the impeller, the micron size bubbles provide the bridging mechanism in between the discrete particles resulting in aggregation.

Figure 4:
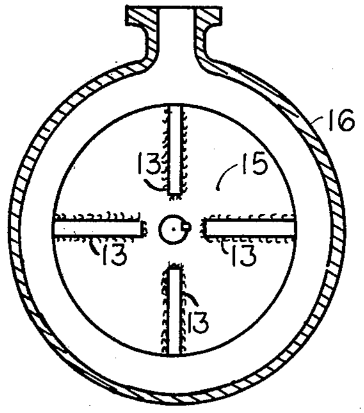
FIG. 4 is a sectional view of the mechanical aerator-mixer along the line 4—4 of FIG. 3.

Again it is to be stressed that this aggregation of suspended non-sugar particles and minute air bubbles is accomplished without the conventional practice of adding inorganic or other flocculating agents such as phosphoric acid and lime to the syrup prior to aeration. Thus there is no interference by flocculating agents to the formation of the minute air bubbles nor to the movement of the particles of non-sugars out of solution. Because no flocculating agents need to be added prior to aeration, the process is less expensive and simpler to perform than those requiring such pre-aeration flocculants. Because there is no pre-aerator-added flocculant in the syrup at this point, there are no restrictions to the shear action and violence of motion to which the material can be subjected. When flocculants are added to the material prior to aeration, violent action and high shear forces must be avoided as such will break down the flocculant and thereby decrease its effectiveness as well as causing the loss of sugar absorbed and/or attached to the flocculant so treated. This simple combined centrifugal aspirator-aerator-mixer as shown in FIGS. 2–4 thus efficiently achieves the function of preparing the syrup containing non-sugars for separation and disposal of the non-sugars by flotation thereby purifying the sugar syrup. It is to be noted that no additional or separate mixer is required as in prior purifier designs.

CLARIFICATION

The outlet of the mechanical aerator-mixer 3 is piped to a discharge point 18 located within the clarifier tank 4 at an elevation somewhat less than that of the bottom of tank 6 of the centrifugal aspirator 2. The difference in level is thus sufficient to compensate for friction in the line and system losses and allowing the flow from tank 6 of the aspirator 2 to the discharge point 18 in the clarifier tank 4 to occur by gravity. This is essential as the pumping ability of the mechanical aerator-mixer cannot be relied upon for moving the syrup this distance because of the erratic action caused by the admission of air into the syrup and the energy losses inherent to the mixing with the impeller of my design. Aerator-mixer discharge pipe 17 is designed to maintain a laminar flow with a somewhat lower Reynolds number than that in the standpipe 10, typically less by 100.

At the discharge 18 in the clarifier tank 4, a creamy liquor is obtained, a portion of which if held in a test tube for more than one minute, will separate into two fractions when the scum, formed of air bubbles attached to the suspended particles, rises to the top surface of the volume of the creamy liquor, and has a density of less than 1 gm/ml and typically less than 0.5 gm/ml.

The scum may then be separated by filtration, but the preferred method is by flotation due to the low density of the aggregate in comparison to the evaporated liquor. Separation by flotation is accomplished in the clarifier tank 4 as the creamy liquor flows out of the discharge port 18 at a preferred rate of 0.5 to 1.0 gpm/sq. ft. and no more than 2 gpm/sq. ft. A higher rate of flow which would result from too small a discharge port would create circulation currents to keep the syrup in suspension in the foamy scum.

The aerated liquor leaving the aerator-mixer 3 through pipe 17 and then through the enlarged pipe 18 having a diameter three times that of the aerator-mixer discharge pipe 17, flows upwards in pipe 18 around which is co-axially located the cylindrical open-topped clarifier tank 4. The creamy liquor discharges from pipe 18 at no less than six inches below the scum removal pipes 19 which are in turn connected to centrally located box 20 from which the scum is pumped out of the system. The minimum of six inches of scum layer is ensured by removing the clarified liquor from the bottom of the clarifier 4 through pipes 21 and 22 which elevate the clarified liquor to a level adjusted to be somewhat lower than the level of discharge port 18 by a weir or other device in tank 23. Moreso, the minimum of six inches of scum layer on top of the liquor level is required to allow the scum to liberate itself by drainage of most of the entrained liquor. This scum blanket may be increased to a maximum of 12 inches. The clarified liquor removed through pipe 22 overflows into tank 23 and from there is diverted by pipe 5 to the vacuum pan supply tank. The scum pickup pipes 19 are perforated at about 6" intervals. The box 20 and attached pipes 19 can be rotated slowly by motorized drive 24 to slowly sweep the surface of the scum to increase the effectiveness of scum removal without striking the scum enough to break up the bubbles. The scum may also be scraped off the surface in an alternative embodiment by a centrally located motor and gearing at the location of box 20. The radially mounted scrapers divert the scum to a number of channel collectors located diametrically across the clarifier surface along a distance of ⅔ of the radius from the outer wall. The channel collectors then discharge into a launder mounted along the circumference of the clarifier and from there is pumped out of the system. This method has a disadvantage in comparison to the one described above. The scraper squeezes a portion of the scum against the vertical side of the collecting channel, thus forcing the air out of the aggregates resulting in part of the latter going back into suspension in the liquor.

In order to obtain maximum separation of the scum and purified syrup in the clarifier tank it is advantageous to prevent the circulation currents caused by convection in the clarifier tank when the temperature of the syrup in the clarifier tank is not held constant. I have therefore provided a thermostatically controlled means to inject steam into the syrup in pipe 17 connecting the aerator-mixer 3 and the clarifier tank 4. The temperature pickup for the thermostat is in the clarifier tank 4 and the thermostat is set to maintain a temperature of 160° F. to 190° F. in the clarifier tank 4.

I have also found that in my improved apparatus and process, a controlled addition of an anionic flocculant, preferably a partially hydrolized polyacrylamide at the rate of less that 15 parts per million of total dissolved solids in the liquor will enhance a better aggregation of the suspended discrete particles of non-sugars as a coating on the minute air bubbles and result in a reduction of the clarifier residence time from a range of 30–60 minutes to one of 15–20 minutes.

The heat control and flocculant addition are provided to the liquor by designing the discharge pipe 17 of such a length between the aerator-mixer 3 and the clarifier tank 4 to accomodate a direct steam injection at point 25 to maintain the temperature at 160° L F. to 190° F. followed by a direct injection of the flocculant at point 26. Typically, the steam injection requires a length equal to 18 to 20 times the diameter of pipe 17, and the flocculant injection point to be about 20 to 30 times the diameter of pipe 17 before connecting to pipe 18 at the clarifier 4. The steam injector is typically a ½" diameter pipe 27 with many ⅛" perforations and with the terminal end farthest from the steam inlet closed.

In order to find the most effective means of achieving optimum aggregation of air and non-sugar particles, two methods of presenting air bubbles in sufficient amount to the discrete particles were tried and their respective effect in reducing the turbidity of the evaporated sugar liquor were compared. Turbidity, caused by material in suspension, is herewith expressed in milli absorbency units (m.a.u.) at a wavelength of 420 nm as per the I.C.U.M.S.A. method.

Method I as shown in FIG. 1 and described hereinabove using the aspirator-aerator-mixer proved to more effective by far in reducing the turbidity of the evaporated liquor in comparison to Method II. In Method II, ambient air drawn into the sugar liquor through the aspirator 2 was supplemented with compressed air injected directly along the standpipe 10 through a perforated pipe of ½" in diameter running inside of standpipe 10. The perforations were approximately 1/64" in diameter. This mixture of air and sugar liquor was then piped directly into the clarifier through discharge port 18 without the use of the mechanical aerator-mixer 3.

| State of Evaporated Liquor | Turbidity (ma.au. @ 420nm) | Turbidity % Removal |
|---|---|---|
| Unclarified | 2,663 | — |
| Clarified by Method I | 990 | 62.82% |
| Clarified by Method II | 2,490 | 6.39% |

With Method II, hardly any aggregation of the discrete particles was observed. This result was attributed to the large size of air bubbles which were approximately 0.1 mm. obtained with Method II whereas with Method I, the liquor partakes a creamy appearance and the air bubbles were established to be about 1 micron and less in size. Thus the effectiveness and the required function of the mechanical aerator-mixer 3 was proved.

In addition to the above-noted reduction in turbidity resulting from the utilization of Method I, the latter also demonstrated an effect of decolorization typically in excess of 10% as per the average of a number of runs as noted below.

| State of Evaporated Liquor | Color (m.a.u.@420nm) | Color (% removal) |
|---|---|---|
| Unclarified | 14,220 | — |
| Clarified by Method I | 12,110 | 14.84% |

It is to be noted that while in the preferred embodiment in tank 6 of the centrifugal aspirator is cylindrical, it need only be substantially circular as even an oblong semi-spherical bowl as used for lavatories provide a circular flow with a vortex forming at the central outlet. It can also be shown that water discharged from the swingable spout above a rectangular relatively large kitchen sink can be so directed that a swirling flow will create a vortex at the drain outlet as is used in this apparatus for the desired rate of aspiration of air.

I claim:

1. An in-line continuous process for the purification of an evaporated non-sugar particle containing sugar solution without using chemical additives prior to introducing air therein which comprises the steps of:

a. introducing air into said solution to form a mixture of air and said solution;

b. transforming the mixture into a creamy liquor having non-sugar particles appregated to minute interspersed air bubbles;

c. separating the aggregated non-sugar particles and bubbles from the transformed mixture; and d. recovering as product the sugar solution so separated from the aggregated non-sugar particles.

2. A process as claimed in claim 1 wherein said air is introduced into said solution by forming a vortex in the flow of said solution.

3. A process as claimed in claim 1 wherein said minute bubbles are formed by cavitation as well as by high shear forces.

4. A process as claimed in claim 1 also consisting of an additional step of adding an anionic partially hydrolized polyacrylamide at a low controlled rate following step b and before step c.

5. A process as claimed in claim 1 wherein said separating of the aggregated particles and bubbles from the sugar solution is accomplished by filtration.

6. A process as claimed in claim 1 wherein said separating of the aggregated particles and bubbles from the sugar solution is accomplished by a flotation process.

7. A process as claimed in claim 6 wherein the temperature of the mixture passing through the flotation process is held approximately constant to limit convection currents which could reduce the efficiency of separation of the aggregated particles from the transformed mixture.

8. A process as claimed in claim 6 wherein the flotation process allows for a layer of aggregated non-sugar particles and bubbles of 6 to 12 inches above the level at which the transformed mixture is admitted to the flotation process.

9. A process as claimed in claim 6 wherein the transformed mixture is admitted to the flotation process at a maximum rate of 2 gallons per minute per square foot.

10. A process as claimed in claim 1 wherein the interspersed air bubbles are of generally micron size.

11. A process as claimed in claim 1 wherein the non-sugar particles separated comprise hydrophobic particles.

* * * * *